J. A. DIETZ.
COMBINED BOILER AND PRESS.
APPLICATION FILED APR. 8, 1910.
1,033,387.
Patented July 23, 1912.
2 SHEETS—SHEET 1.
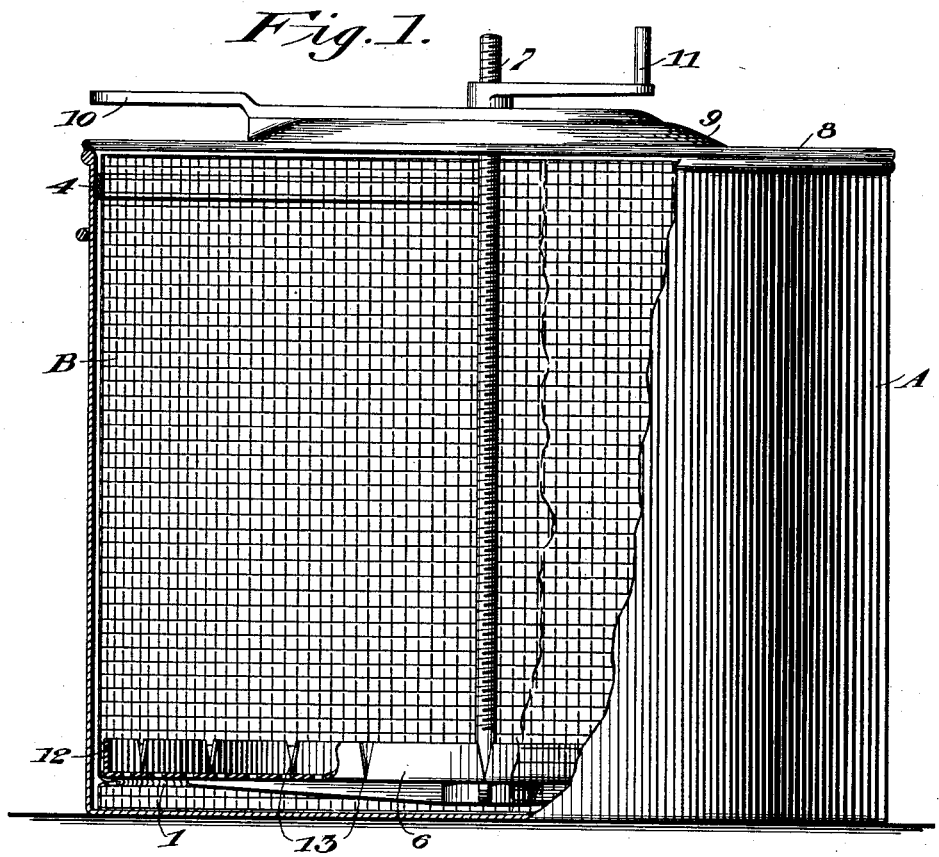
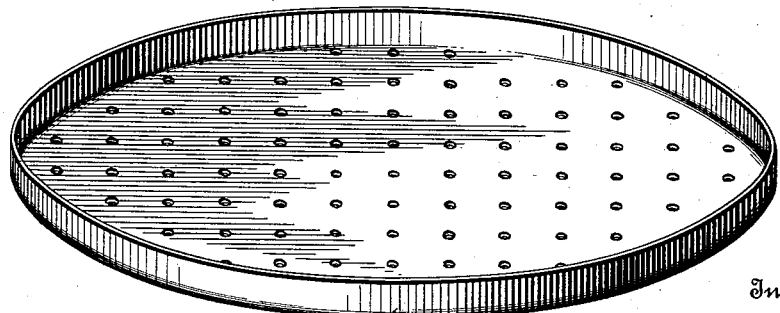
Witnesses
Lloyd W. Patch
A. A. Hammond
Inventor
Joseph A. Dietz
By Louis Bagger & Co.
his Attorneys J. A. DIETZ.
COMBINED BOILER AND PRESS.
APPLICATION FILED APR. 8, 1910.
1,033,387.
Patented July 23, 1912.
2 SHEETS—SHEET 2.
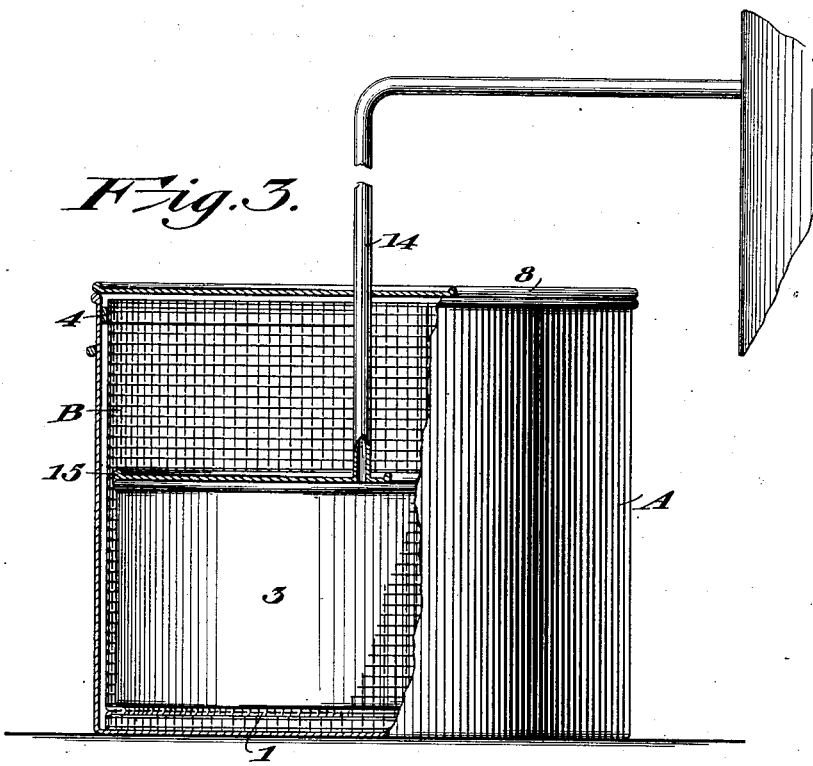
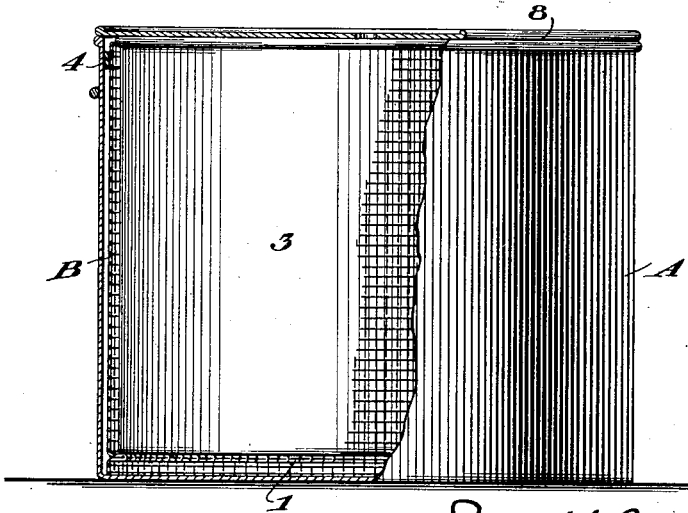

UNITED STATES PATENT OFFICE.

JOSEPH A. DIETZ, OF KERSEY, PENNSYLVANIA.

COMBINED BOILER AND PRESS.

1,033,387. Specification of Letters Patent. Patented July 23, 1912.

Application filed April 8, 1910. Serial No. 554,170.

*To all whom it may concern:*

Be it known that I, JOSEPH A. DIETZ, a citizen of the United States, residing at Kersey, in the county of Elk and State of Pennsylvania, have invented certain new and useful Improvements in Combined Boilers and Presses, of which the following is a specification.

My invention relates to an improvement in a combined boiler and press, and the object is to provide means whereby fruits and vegetables can be cooked, and in cooking fruits, the juice can be removed by pressing the fruit under suitable pressure for causing the juice to be squeezed therefrom.

The invention consists in certain novel features of construction and combinations of parts which will be hereinafter fully described and pointed out in the claims.

In the accompanying drawings:—Figure 1 is a vertical sectional view; Fig. 2 is a view of the perforated pan or strainer; Fig. 3 is a vertical sectional view of the invention when used for stewing purposes; and Fig. 4 is a vertical sectional view of a slightly modified form of the structure shown in Fig. 3.

A represents the kettle or boiler, and B is the colander, preferably made of wire of a fine mesh, which is adapted to be received within the kettle. The colander is provided with an inwardly projecting flange 1, and a handle 4 is connected to the colander for the removal of the colander from the kettle the handle being shown in the drawings swung to a position between the colander and kettle. A plunger is received within the colander, and a head 6 of the plunger is provided with perforations which are of a larger size than the perforations in the pan 2. Connected to the head 6 is a screw stem 7 which is adapted to extend through the cover 8, which is mounted upon the kettle A. A block 9 is mounted upon the cover, and the stem 7 is adapted to extend therethrough. The handle 10 is formed on the block, by which the block can be held from moving, so that as the crank 11 is screwed down upon the stem 7 for drawing the plunger head upward for pressing the fruit between the cover and head, the crank will have a bearing surface which will be rigid, and allow the proper compressing of the fruit or vegetables held between the plunger head and cover, for drawing the liquid or juice from the fruit and causing it to pass through the colander into the kettle. The head 6 is adapted to rest upon the flange 1, previous to the pressing operation.

When it is desired to remove the juice from fruits and the like, it is placed between the cover of the kettle and the head 6 of the plunger, the plunger being provided with suitable up-turned flanges 12 for holding the contents, and the notches or openings 13 formed in the flange allow the liquid to pass off from the head. The crank 11 is turned upon the stem 7, causing the plunger head to be drawn toward the cover of the kettle. This compresses the fruit, and causes the liquid to drain off into the kettle.

In cooking vegetables, the perforated pan 2 will be placed upon the flange 1 of the colander, which will support the vegetables at a sufficient elevation in the kettle to prevent the vegetables from burning.

As disclosed in Figs. 3 and 4, I have shown the pan 3 supported by the flange and a tube 14 for conducting off any odors when necessary in stewing. Fig. 3 shows the pan extending about half-way in the colander, and the cover 15 prevents any of the boiling water from passing into the pan.

Having fully described my invention, what I claim as new and desire to secure by Letters Patent, is:—

1. In a boiler, the combination with a kettle having a bottom, of a wire colander received within the kettle and supported on the bottom, a plunger having a perforated head adapted to be received within the colander and having a snug fit therewith, the body portion of the colander bent to form an inwardly-projecting flange slightly above the bottom upon which the plunger is received and supported, a cover for the kettle, and means connected with the plunger and extending through the cover for compressing the material between the plunger and cover.

2. In a boiler, the combination with a kettle having a bottom, of a wire colander received within the kettle and supported on the bottom, a plunger received within the colander, an upwardly-projecting flange formed on the outer edge of the plunger to snugly engage with the surface of the colander, said plunger and flange having perforations therethrough, the body portion of the colander bent to form an inwardly-projecting flange slightly above the bottom upon which the plunger is received and supported, a cover for the kettle, and means
5 connected with the plunger and extending through the cover for compressing the material between the plunger and cover.

In testimony whereof I affix my signature, in the presence of two witnesses.

JOSEPH A. DIETZ.

Witnesses:
WM. WISMILLER,
WM. WISMILLER.

Copies of this patent may be obtained for five cents each, by addressing the "Commissioner of Patents, Washington, D. C."